United States Patent
Hughes et al.

(10) Patent No.: US 7,582,215 B2
(45) Date of Patent: *Sep. 1, 2009

(54) PRODUCTION OF A FERMENTATION PRODUCT

(75) Inventors: Jonathan Hughes, Huddersfield (GB); Kenneth Charles Symes, Keighley (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 528 days.

This patent is subject to a terminal disclaimer.

(21) Appl. No.: 10/523,301

(22) PCT Filed: Jul. 30, 2003

(86) PCT No.: PCT/EP03/08427

§ 371 (c)(1),
(2), (4) Date: Aug. 4, 2005

(87) PCT Pub. No.: WO2004/015121

PCT Pub. Date: Feb. 19, 2004

(65) Prior Publication Data

US 2006/0057264 A1 Mar. 16, 2006

(30) Foreign Application Priority Data

Aug. 5, 2002 (GB) ................................. 0218021.4

(51) Int. Cl.
*B01D 37/02* (2006.01)
(52) U.S. Cl. ............. 210/710; 210/712; 210/714; 210/727; 210/728; 210/730; 426/49; 426/495; 435/106; 435/109; 435/139; 435/140; 435/141; 435/144; 435/145; 435/146; 435/150; 435/159; 435/160; 435/163

(58) Field of Classification Search ............... 210/728; 435/163
See application file for complete search history.

(56) References Cited

U.S. PATENT DOCUMENTS 4,384,897 A 5/1983 Brink .................... 127/37

(Continued)

FOREIGN PATENT DOCUMENTS

EP 0202780 11/1986

(Continued)

OTHER PUBLICATIONS

Minowa et al., "The Characteristics Of Dewatering Ethanol Fermentation Stillage," (abstract), 113:194787, Kogai Shigen Kenkyusho Iho, 1989.*

(Continued)

*Primary Examiner*—Peter A Hruskoci
(74) *Attorney, Agent, or Firm*—Shiela A. Loggins

(57) ABSTRACT

A process of separating suspended solids from a fermentation liquor by subjecting the liquor to a solids-liquid separation stage, wherein the fermentation liquor is produced in a fermentation process for the production of a fermentation product, which liquor comprises water, lignin and BOD, wherein the solids liquid separation stage is assisted by a treatment system, characterised in that the treatment system comprises either, (i) a cationic polymer having an intrinsic viscosity (IV) of at least 4 dl/g at a dose of above 2 kg/tonne based on dry weight of suspension, or (ii) a cationic polymer having an intrinsic viscosity (IV) of at least 4 dl/g and, (iii) an anionic polymer, and/or (iv) a cationic polymer of intrinsic viscosity of below 4 dl/g and a cationic charge density of at least 3 meq/g and/or (v) inorganic coagulants and/or (vi) charged microparticulate material.

17 Claims, 1 Drawing Sheet

U.S. PATENT DOCUMENTS

| | | | | |
|---|---|---|---|---|
| 4,650,689 | A | 3/1987 | Hedrick | 426/600 |
| 4,728,613 | A | 3/1988 | Brewer et al. | 435/222 |
| 5,112,500 | A | 5/1992 | Jones | 210/728 |
| 5,178,774 | A | 1/1993 | Payne et al. | 210/727 |
| 5,536,325 | A * | 7/1996 | Brink | 127/43 |
| 5,552,316 | A | 9/1996 | Savage | 435/261 |
| 5,698,109 | A | 12/1997 | Payne et al. | 210/727 |
| 5,846,433 | A | 12/1998 | Sorensen et al. | 210/709 |
| 5,975,439 | A | 11/1999 | Chieffalo et al. | 241/17 |
| 6,031,037 | A | 2/2000 | Ghafoor et al. | 524/388 |
| 6,071,417 | A * | 6/2000 | Adachi | 210/723 |
| 6,132,625 | A * | 10/2000 | Moffett | 210/727 |
| 6,967,085 | B1 * | 11/2005 | Hughes et al. | 435/29 |
| 7,244,596 | B2 * | 7/2007 | Baets et al. | 435/135 |
| 7,455,997 | B2 * | 11/2008 | Hughes | 435/109 |
| 2005/0079270 | A1 * | 4/2005 | Scheimann | 426/623 |

FOREIGN PATENT DOCUMENTS

| | | |
|---|---|---|
| EP | 0262945 | 4/1988 |
| EP | 0513352 | 11/1992 |
| WO | WO86/03514 | 6/1986 |
| WO | WO 93/02967 | 2/1993 |
| WO | WO 01/12778 | 2/2001 |
| WO | WO 02/16495 | 2/2002 |

OTHER PUBLICATIONS

Patent Abstracts of Japan Publication No. 09059891 (Jul. 31, 1997).
Patent Abstracts of Japan Publication No. 53023145 (Apr. 28, 1978).
Derwent Abstr. 1984-026659 [05] for JP 58216777 (1983).
Derwent Abstr. 1980-70613C [25]for JP 55109487 (1980).
NREL/TP-580-26157, Jul. 1999, "Linocellulosic Biomass to Ethanol Process Design and Economics Utilizing Co-Current Dilute Acid Prehydrolysis and Enzymatic Hydrolysis Current and Futuristic Scenarios".
Wilkie et al., Biomass and Bioenergy, vol. 19, (2000), pp. 63-102.
NREL-99-10600/14, (Mar. 2001), "Liquid/Solid Separation".

* cited by examiner

PRODUCTION OF A FERMENTATION PRODUCT

The present invention relates to processes of treating plant derived material to provide an aqueous liquor containing sugars which are used in a fermentation process to produce a fermentation product. In particular the present invention relates to a process of dewatering a fermentation broth residue, produced as a by-product from the distillation recovery of a fermentation product. Typically the dewatered solids are dried and used as a solid fuel. The clarified water would normally be returned to watercourses and/or used as wash liquor further back in the process.

Typically such fermentation products include for instance ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde, 3-hydroxypropionic acid, glyconic acid and tartaric acid and amino acids such as L-glutaric acid, L-lysine, L-aspartic acid, L-tryptophan, L-arylglycines or salts of any of these acids.

It is known to treat a biomass with acid in order to hydrolyse polysaccharides to the component sugars that can be used in a fermentation process to produce a fermentation product. For instance U.S. Pat. No. 4,384,897 describes a method of treating biomass material in which it is subjected to a two stage hydrolysis in which polysaccharides that are more easily hydrolysed, such as hemi-cellulose and then in a second stage the material that is more difficult to depolymerise e.g. cellulose, is depolymerised using a more severe hydrolytic treatment. The products of the first and second stages include sugar solutions and organic acids, aldehydes. The monosaccharides are subjected to fermentation to produce ethanol and the beer resulting from the fermentation may then be subjected to rectification to produce ethanol of commercial grade. U.S. Pat. No. 4,384,897 sets out to provide improvements in more efficient washing of solids, the use of co-current washing or countercurrent washing of solids and proposes the use of ferric and or [aluminum]ions as flocculating agents to separate finely dispersed solids resulting from the neutralisation of the hydrolysate liquor stream.

It is also known from a National Renewable Energy Laboratory (NREL) report entitled "Lignocellulose Biomass to Ethanol Process Design and Economics of Co-Current Dilute Acid Prehydrolysis and Enzymatic Hydrolysis Current and Future Scenarios", NREL/IP-580-26157 (July 1999) to treat cellulose as the second polysaccharide by a cellulase enzyme in order to hydrolyse the cellulose into its component sugars. In one form of this process the solid by-product residue resulting from the first hydrolysis step and containing cellulose is divided into a main stream and a secondary stream. The main stream is fed directly into the fermentation vessel and the secondary stream is passed to a cellulase production stage, in which fungi are allowed to grow and act upon the cellulose, such that sugars and cellulase are form. The sugars and cellulase are then fed into the fermentation vessel and the cellulase acts upon the cellulose from the main stream and converts it into the component sugars which in turn can be fermented to produce the fermentation product.

It is known to treat shredded cellulosic material using concentrated acid to provide aqueous solutions of sugars, which can be used in a fermentation process. For instance U.S. Pat. No. 4,650,689 discloses a process of preparing ethanol from cellulosic material by subjecting the cellulosic material to highly concentrated mineral acid gas such as HCl under pressure, and treatment with hot water to give a liquor containing sugars which can be fermented.

U.S. Pat. No. 5,975,439 describes an automated process for producing ethanol by shredding the cellulosic component of municipal solid waste and mixing this with equal amounts of concentrated sulphuric acid at high temperature to provide a digested mixture. The aqueous sugar solution is separated from the solids by a filtration process before being subjected to a fermentation process.

However, in the recovery of the fermentation product from the fermentation broth it is sometimes necessary to continually distil off the fermentation product in a distillation stage, wherein a stillage stream, comprising residues and by-products is removed.

WO-A-8603514 describes manufacture of ethanol by fermentation and then extraction of the ethanol from the fermentation broth. The residual fermentation broth liquor contains yeast and dissolved polymeric materials such as polysaccharides and proteins. An advantage of locating the solid liquid separation stage after the distillation stage is that some part of the non-separable dissolved protein in the fermentation liquor is transferred into a separable form through coagulation due to heating in the distillation and heat exchange processes.

In a study by Ann C Wilkie et al (Biomass and Bioenergy 19 (2000) 63-102, the treatment of ethanol stillage is evaluated. The bacterium, *Zymomonas mobilis* has been shown to produce higher ethanol yields but there is difficulty in separating the stillage liquor from the solid material. The study also identifies the difficulty in separating suspended solids from sugar crops and cellulosic crops.

In general, the stillage stream or still bottoms resulting from the distillation processes are subjected to a solids-liquid separation step to produce a dewatered product which can be dried to produce a dry solid fuel product. The aqueous liquid separated from the solids are either returned to watercourses and/or recycled as wash water used in the washing of acid treated plant derived material. The stillage stream or still bottoms are normally high in BOD (Biological Oxygen Demand) and so it is important to ensure that the aqueous liquor is effectively clarified and the water produced therefrom is substantially free of impurities in order not to poison watercourses and/or when used as wash liquor contaminate the substrate that is being washed.

The stillage stream containing precipitated protein based impurities and high levels of lignin, which make it difficult to flocculate and effect solids-liquid separation. It is known from an NREL report entitled "Liquid/Solid Separation" 99-10600/14 (March 2001) to treat post distillate slurry with a single polymer solution of concentration 0.01 to 0.02 wt %, identified as Perc-765, at doses in the range of 0.4 to 1 Kg/tonne of dry solids to effect the dewatering of the solids on a belt press to a final solids content of 26-29 wt %. However, the filtrate clarity is poor, with separation of a dilute feed of concentration 3 to 4 wt % producing a filtrate containing solids of 0.25 wt % or greater. It is noted that when operating with a desired feed concentration of 11.7 wt %, the ability to flocculate the solids may be impacted by this difference and either dilution of the feed, greater mixing intensity, and/or increased polymer dosages may result. Based on the final solids content and the filtrate solids content, belt presses were not recommended for this application. Furthermore, the liquor is normally at an elevated temperature, for instance above 50° C. and can be as high as 95° C. or 100° C. At these elevated temperatures it is normally even harder to adequately flocculate these liquors. It is therefore an objective to improve the solids-liquid separation.

A process of separating suspended solids from a fermentation liquor by subjecting the liquor to solids liquid separation stage, wherein the fermentation liquor is produced in a fermentation process for the production of a fermentation product, which liquor comprises water, lignin and BOD, wherein the solids-liquid separation stage is assisted by a treatment system, characterised in that the treatment system comprises either,
(i) a cationic polymer having an intrinsic viscosity (IV) of at least 4 dl/g at a dose of above 2 kg/tonne based on dry weight of suspension, or
(ii) a cationic polymer having an intrinsic viscosity (IV) of at least 4 dl/g and,
(iii) an anionic polymer, and/or
(iv) a cationic polymer of intrinsic viscosity of below 4 dl/g and a cationic charge density of at least 3 meq/g and/or
(v) inorganic coagulants and/or
(vi) charged microparticulate material.

Intrinsic viscosity is measured using a suspended level viscometer in 1M NaCl buffered to pH 7.5 at 25° C.

A BRIEF DESCRIPTION OF THE DRAWINGS

FIG. 1 shows a test rig in part sectional side elevation.
FIG. 2 is a plan view of the rig of FIG. 1.
FIG. 3 is a graph showing the speed of separation at different doncentrations of flocculant.

We have found that surprisingly the yield and/or efficiency of the process can be improved by effecting a rapid but efficient solids-liquid separation of the solid residues from an aqueous liquor containing BOD and that the liquor can be recycled to the fermentation process. The treatment system of the present invention allows a significantly improved separation of liquors from the solid residues and by-products. In particular the process induces more effective flocculation and the separation process is found to be significantly faster. In addition the solid residues, which contain mainly lignin, resulting from the separation process have higher cake solids than conventional separation treatment. Such a solid product would take less time and energy to dry and thus can be for instance used more efficiently as a solid fuel.

Usually the biomass residue comprises in addition to lignin, microbes and residual unconverted cellulose and hemicellulose. Frequently the aqueous liquors will also comprise proteins, polysaccharides, organic and inorganic salts.

It is also important to ensure that very effective separation of liquor from the solid by-product is also achieved more rapidly than conventional treatments.

In one aspect of the present invention the fermentation liquor is subjected to a distillation stage in which the fermentation product is recovered, wherein the liquor is removed from the distillation stage as a stillage stream and then subjected to the solids-liquid separation stage. Thus in this form of the invention the fermentation liquor is essentially free of the fermentation product when it is subjected to the solids-liquid separation stage.

Alternatively the fermentation liquor contains the fermentation product wherein the liquor is subjected to the solids-liquid separation stage and then passed to a distillation stage wherein the fermentation product is recovered. Thus in this form of the invention the solids are removed prior to the distillation stage and thus the distillation column and the stillage stream produced therefrom will be substantially free of the solids.

We have found that the separation process is particularly effective when the treatment system comprises a second component in addition to the cationic coagulant. In particular a preferred embodiment employs a treatment system which comprises (i) the cationic coagulant and (ii) a high IV cationic polymer of intrinsic viscosity of at least 4 dl/g.

In a treatment system comprising cationic coagulant and high IV polymer, the components may be added simultaneously, either as a pre-mix or alternatively separately. In one preferred form of the invention the coagulant is added first followed by the addition of high IV polymer. The reverse order of addition is also possible and may be particularly suited to certain cases.

The cationic coagulant may be a low IV natural, semi-natural or synthetic cationic polymer which exhibits intrinsic viscosity of below 4 dl/g and a cationic charge density of at least 3 meq/g.

Preferably the low IV polymer is selected from the group consisting of polyamines, amine/epihalohydrin addition polymers, polymers of dicyandiamide with formaldehyde, polymers of diallyidimethyl ammonium chloride (DAD-MAC), cationic starch and cationic inulin. Polyamines may be commercially available polyamines, for instance polyethyleneimine (PEI). Cationic starch or cationic inulin may be commercially available products.

Preferred coagulant polymers are addition polymers of formaldehyde with dimethylamine and optionally other amines such as ethylenediamine, for example commercially available as Magnafloc™ 1597 or polymers of formaldehyde with dicyandiamide, for example commercially available as Magnafloc™ 1797. More preferred low IV polymeric coagulants include polymers of water-soluble ethylenically unsaturated cationic monomer or blend of monomers at least one cationic, non-ionic or and/or anionic monomer(s) alone or with other water soluble monomers, provided that the polymer has a cationicity of at least 3 meq/g. By water-soluble we mean that the monomer has a solubility of at least 5 g/100 ml at 25° C. Particularly preferred polymers are homopolymers of diallyidimethyl ammonium chloride or copolymers of diallyldimethylammmonium chloride with up to 20 mole % acrylamide. Typically such polymers would have molecular weights of up to 2,000,000 and usually below 1,000,000. Useful polymers would ideally exhibit an intrinsic viscosity of below 4 dl/g.

Inorganic coagulants may be any suitable inorganic coagulants, for instance alum or polyaluminium chloride (PAC).

Anionic polymers may be water-soluble or water-swellable natural polymers or their derivatives. These may include starch derivatives, soluble cellulosic polymers, plant gums, marine gums, microbial gums, proteinaceous and polypeptide extracts and synthetic analogues. The anionic polymer maybe a synthetic polymer that has been formed from ethylenically unsaturated water-soluble monomer or monomer blend. These monomers may include (meth) acrylic acid and its salts, maleic acid and its salts, itaconic acid and its salts and the like.

When the process also involves a cationic coagulant and a high IV cationic polymer, the high IV polymer may be desirably selected from water-soluble or water swellable polymers. The polymer may be a natural polymer or a synthetic polymer which has been formed from ethylenically unsaturated water-soluble monomer or monomer blend. Suitably the high IV polymer is a flocculating agent selected from the group consisting of water soluble or water swellable natural, semi-natural and synthetic polymers. Natural polymers are desirably chitosan based materials. Preferably the polymer is synthetic and may be formed by polymerisation of at least one cationic, non-ionic or and/or anionic monomer(s) alone or with other water-soluble monomers.

Preferably high IV polymeric flocculating agents are formed from ethylenically unsaturated water soluble monomers that readily polymerise to produce high molecular weight polymers. Particularly preferred polymers include monomers that are selected from the group consisting of polyacrylamide, copolymers of acrylamide with (meth) acrylic acid or salts thereof, copolymers of acrylamide with dialkylaminoalkyl (meth) acrylate or acid addition or quaternary ammonium salts, polymers of diallyldimethyl ammonium chloride. The polymers may be linear in that they have been prepared substantially in the absence of branching or cross-linking agent. Alternatively the polymers can be branched or cross-linked, for example as in EP-A-202780.

Desirably the coagulant and high IV polymer are added sequentially, preferably employing the coagulant first. In this way the addition of the coagulant coagulates the suspended solids and the coagulated solids are then flocculated by the bridging flocculant. However, in some instances it may be desirable to add the high IV flocculant first followed by the coagulant. It may also be desirable the coagulant and high IV polymer are added simultaneously, preferably as a premix.

In the case where the treatment system employs a premix, the coagulant may be an inorganic coagulant or the aforementioned low IV polymer. Preferably the pre-mix comprises (i) a low IV cationic polymer of intrinsic viscosity of below 4 dl/g and a cationic charge density of at least 3 meq/g and (ii) a high IV cationic polymer of intrinsic viscosity of at least 4 dl/g.

The coagulant is suitably introduced into the aqueous suspension in any suitable amount in order to effect coagulation of the suspended solids. Usually the dose of coagulant is at least 50 grams per tonne (based on dry weight of biomass residue). The dose of coagulant is usually significantly higher, and can be typically up to 5000 grams per tonne. Usually the amount of coagulant is added in an amount between 500 and 3000 grams per tonne, especially around 750 to 2000 grams per tonne.

When the treatment employs a high IV flocculant with the cationic coagulant, the dose of flocculant is typically at least 50 grams per tonne (based on dry weight of biomass residue). The dose of flocculent is usually significantly higher, and can be typically up to 5000 grams per tonne. Usually the amount of flocculent is added in an amount between 500 and 3000 grams per tonne, especially around 750 to 2000 grams per tonne.

In order to ensure that the coagulated and/or flocculated solids are separated from the liquid medium, the biomass residue is subjected to a mechanical dewatering stage during or subsequent to application of the treatment system. The mechanical dewatering step is ideally selected from at least one of, a centrifuge, a screw press, a filter press, a belt filter press a horizontal belt filter or preferably a pressure filter.

The liquor separated from the biomass residue comprising sugars and/or cellulose are generally free of unwanted suspended solids and desirably are recycled into a fermentation process in order to produce a fermentation product.

The dewatered biomass residue comprises lignin and thus is generally difficult to dewater. Generally the dewatered biomass residue is subjected to a drying stage and the dried residue may for instance be used as a solid fuel, a nutrient source for further fermentation or a source of chemicals. The process enables the manufacture of the fermentation product to be made more efficiently. Preferably the fermentation product is selected from the group consisting of ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde, 3-hydroxypropionic acid, glyconic acid and tartaric acid and amino acids such as L-glutaric acid, L-lysine, L-aspartic acid, L-tryptophan, L-arylglycines or salts of any of these acids.

The following examples illustrate the invention.

EXAMPLE I

Pre-hydrolysis: Milled wood chips steamed with low pressure steam to approximately 100° C. After steaming concentrated sulphuric acid is diluted and added to the mixture until the mixture contains 0.52% acid and the solids in the reactor are 22% by weight. The mixture is then steamed heated to 175° C. for 15 minutes. The mixture is then flash cooled for 15 minutes to remove 6.5% of the acetic acid and 61% of the furfural and hydroxymethyl furfural.

Separation: The 26% insoluble solids present in the pre-hydrolysed slurry (containing 0.38% sulphuric acid) is treated then separated on a filter press. A method of reducing the toxins remaining in the liquid portion is to wash with (recycled) water. After ion exchange to remove acetic acid, the liquid portion of the hydrolysate is acidified to pH 2 by the addition of sulphuric acid. Lime is then added to raise the pH to 10 and the liquor is heated to 50° C. The liquid is then adjusted to the fermentation pH of 4.5 for 4 hours allowing gypsum crystals to form for separation by filtration.

Simultaneous Saccharification and Co-Fermentation (SSCF): Detoxified and diluted hydrolysed solids are split to cellulase fermentations and SSCF fermenters. The hydrolysate feed stream is 22% soluble and insoluble solids. The portion of hydrolysate split off for Z. mobilis seed production is approximately 10%. The portion of hydrolysed solids split off for cellulase production is dependent on the cellulase yield on the xylose and cellulose present and the required loading of enzyme in the SSCF. For cellulase production pre-hydrolysed solids-conditioned hydrolysate liquor, recycle water, corn steep liquor (to 1%) and nutrients (($NH_4$)$_2SO_4$, $KH_2PO_4$, $MgSO_4 \cdot 7H_2O$ $CaCl_2 \cdot 2H_2O$ and Tween 80) and corn oil as an antifoam (0.1% v/v) are combined to give a final cellulose concentration of 4%. The batch is then run for 160 hours at 28° C. to produce cellulase. For SSCF, detoxified hydrolysate slurry (22% total solids) is cooled to 30° C. and added to the fermenter together with a 10% (v/v) seed inoculum. Addition of corn steep liquor to 0.25% and cellulase to give a final concentration of 15 FPU/g (cellulose) and an initial cellulose concentration of 22%. The SSCF fermentation in which cellulose is converted to fermentable sugars by cellulase and the fermentable sugars converted to ethanol by Z. mobilis takes 7 days.

Distillation: A whole beer containing 5.1% ethanol by weight is fed to a distillation column where the ethanol concentration is reduced to 0.12% by weight, and generating vapour containing 37% by weight ethanol.

Separation: A 200 ml portion of the still bottom stream containing 7.5% suspended solids by weight and 2.5% soluble solids at 85° C. was flocculated in a Triton mixer set at a speed of 1500 revs per minute and treated with a 65:35 blend of polymer A (polyDADMAC IV approx 1 dl/g) and polymer B (a cationic polymer active composition 20% acrylamide 80% cationic monomer dimethyl-aminoethyl methacrylate quatemized with methyl chloride having an IV of 4 dl/g preferably after shear as described in EP 0202780B) at a dose of 5 kg/tonne dry solids. The flocculated stillage is allowed one minute of free drainage time. A free drainage of 80 ml in 5 seconds is obtained. A sample of the flocculated material was also transferred to a piston press. A press cycle of ten minutes is used with a maximum pressure of 100 psi. The 5 second filtrate volume was 101 ml and the cake solids was 31.4%.

EXAMPLE II

In order to evaluate the separation of liquid from solids in a fermentation broth a test procedure was established which will now be described by way of example with reference to the accompanying drawings in which.

Figure 1:
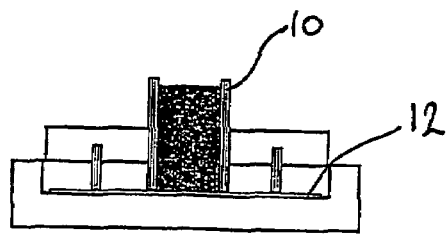
FIG. 1 shows a test rig in part sectional side elevation.
Figure 2:
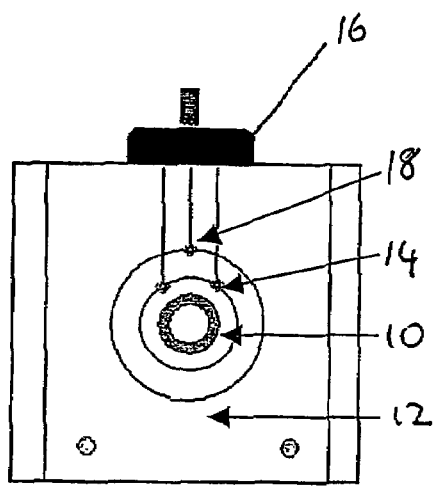
FIG. 2 is a plan view of the rig of FIG. 1.

Referring to the drawings the test rig comprises a vertically oriented open ended tube 10. the lower end of the tube 10 is disposed just above filter paper 12. Contacts 14 are provided on the filter paper which are arranged to supply a signal to a timer 16 to start the timer when liquid spreads to the contacts form the tube 10. A further contact 18 linked to the timer is arranged to turn the timer off when liquid from the tube reaches the contact 18. Thus the rig measures the time taken for liquid to spread across the filter paper from contact 14 to contact 18. This is known as Capillary Suction Time (CST) and is a measure of the speed of separation of liquid from solid in a sample under test.

A 10 ml sample of fermentation broth was placed in a measuring cylinder and flocculant added. The cylinder was closed and then inverted a number of times, for example eight times, in order to ensure good distribution of the flocculant in the fermentation broth at low shear. The sample was then poured into tube 10 of the test rig and the CST obtained.

Figure 3:
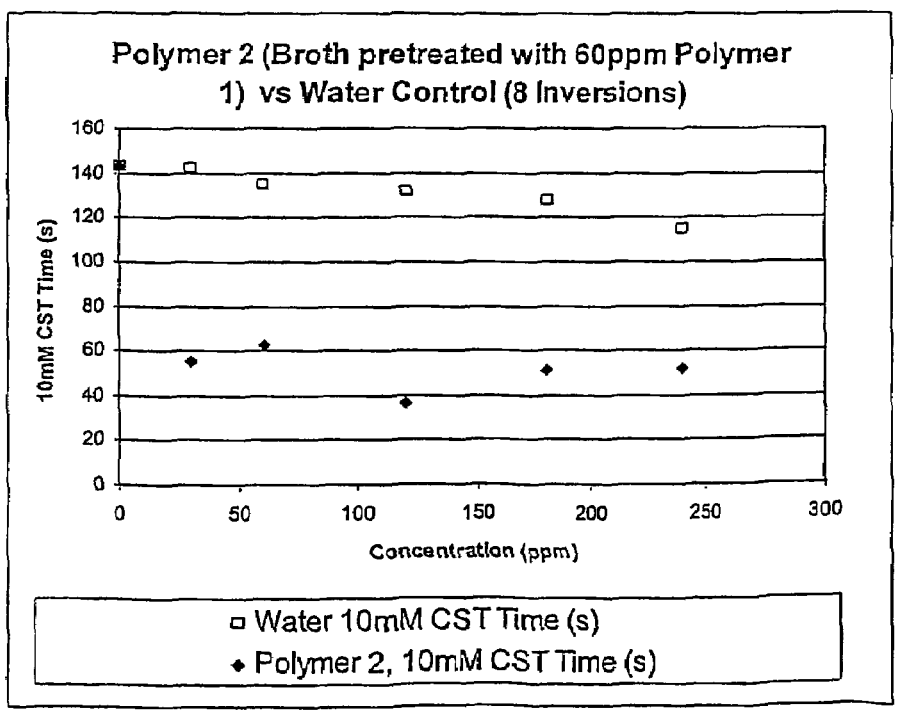
FIG. 3 is a graph showing the speed of separation at different concentrations of flocculant.

The CST, in seconds, of a fermentation broth derived from corn stover pre-treated with 60 ppm of Polymer 1 was measured at different additions of cationic flocculant(Polymer 2). The results are shown in the graph of FIG. 3 which also shows CST for samples with the addition of water in place of flocculant.

Polymer 1 is a copolymer of 52.5 wt % sodium acrylate and 47.5 wt % acrylamide, IV approx. 11 dl/g Polymer 2 is a copolymer of 43.5 wt % acrylamide and 56.5 wt % cationic monomer (dimethylaminoethylacrylate quaternised with methyl chloride), IV approx. 6.5 dl/g.

The invention claimed is:

1. A process of separating suspended solids from a fermentation liquor by subjecting the liquor to a solids-liquid separation stage,
    wherein the fermentation liquor is produced in a fermentation process for the production of a fermentation product,
    which liquor comprises water, lignin and BOD,
    wherein the solids-liquid separation stage comprises adding to the fermentation liquor,
        (ii) a cationic polymer having high intrinsic viscosity (IV) of at least 4 dl/g and at least one component selected from the group consisting of
        (iii) an anionic polymer,
        (iv) a cationic polymer of low intrinsic viscosity of below 4 dl/g and a cationic charge density of at least 3 meq/g,
        (v) inorganic coagulants and
        (vi) charged microparticulate material
    flocculating the suspended solids and lignin in the fermentation liquor and
    subjecting the fermentation liquor to a mechanical dewatering stage selected from at least one of, a centrifuge, a screw press, a filter press, a belt filter press, a horizontal belt filter or a pressure filter to separate the flocculated suspended solids and lignin as cake solids.

2. A process according to claim 1 in which the fermentation liquor is subjected to a distillation stage wherein the fermentation product is recovered, wherein the liquor is removed from the distillation stage as a stillage stream and then subjected to the solids-liquid separation stage.

3. A process according to claim 1 in which the fermentation liquor contains the fermentation product wherein the liquor is subjected to the solids-liquid separation stage and then passed to a distillation stage wherein the fermentation product is recovered.

4. A process according to claim 1 in which component- (iv) is added to the fermentation liquor.

5. A process according to claim 1 in which (iv) the low IV polymer is selected from the group consisting of polyamines, amine/epihalohydrin addition polymers, polymers of dicyandiamide with formaldehyde, polymers of diallyldimethyl ammonium chloride (DADMAC), cationic starch and cationic inulin.

6. A process according to claim 1 in which the inorganic coagulants are selected from the group consisting of alum and polyaluminium chloride (PAC).

7. A process according to claim 1 in which the component is (vi) charged microparticulate material.

8. A process according to claim 1 in which the high IV polymer (component (ii)) is selected from water soluble or water-swellable polymers, which polymer is a natural polymer, semi-natural polymer or a synthetic polymer which has been formed from ethylenically unsaturated water-soluble monomer or monomer blend.

9. A process according to claim 8 in which the high IV polymer (component (ii)) is either a chitosan based material or a polymer of acrylamide with one or more water soluble cationic monomers selected from dialkylaminoalkyl (meth) acrylates, dialkylaminoalkyl (meth) acrylamides and acid addition salts or quaternary ammonium salts thereof.

10. A process according to claim 1 in which the component is selected from the group consisting of (iv) low IV cationic polymer, (v) inorganic coagulants and (vi) charged microparticulate material, and the component and the high IV polymer (component (ii)) are added sequentially.

11. A process according to claim 1 in which the component is selected from the group consisting of (iv) low IV cationic polymer, inorganic coagulants and charged microparticulate material, and the component and the high IV polymer (component (ii)) are added simultaneously.

12. A process according to claim 11 wherein the component is and high IV polymer are a premix comprising- (iv) a low IV cationic polymer of intrinsic viscosity of below 4 dl/g and a cationic charge density of at least 3 meq/g and (ii) a high IV (component (ii)) cationic polymer of intrinsic viscosity of at least 4 dl/g.

13. A process according to claim 1 in which the dose of coagulant is at least 50 grams per tonne (based on dry weight of fermentation liquor).

14. A process according to claim 1 in which the dose of high IV polymer is at least 50 grams per tonne (based on dry weight of fermentation liquor).

15. A process according to claim 1 in which the mechanical dewatering stage produces a liquid and the liquid produced from the mechanical dewatering stage is recycled and used as wash water.

16. A process according to claim 1 in which the cake solids are subjected to a drying stage to provide a dry solid material and in which the dry solid material is used as a solid fuel.

17. A process according to claim 1 in which the fermentation product is selected from the group consisting of ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde and 3-hydroxypropionic acid, glyconic acid and tartaric acid, and amino acids wherein the amino acids are selected from the group consisting of L-glutaric acid, L-lysine, L-aspartic acid, L-tryptophan, L-arylglycines and salts of any of these acids.

* * * * *

UNITED STATES PATENT AND TRADEMARK OFFICE
CERTIFICATE OF CORRECTION

PATENT NO. : 7,582,215 B2
APPLICATION NO. : 10/523301
DATED : September 1, 2009
INVENTOR(S) : Hughes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Fourteenth Day of September, 2010

David J. Kappos
*Director of the United States Patent and Trademark Office*